United States Patent [19]

[11] 3,911,210

[45] Oct. 7, 1975

Oji et al.

[54] RECORDING HEAD SHIFTING MECHANISM OF CYLINDER-SCANNING TYPE IMAGE RECORDING DEVICE

[76] Inventors: Takashi Oji, 47-3, Saiin Hideri-cho, Ukyo-ku; Takeshi Yamazaki, 4, Minamifunaoka-cho, Kita-ku, both of Kyoto, Japan

[22] Filed: June 22, 1973

[21] Appl. No.: 372,482

[30] Foreign Application Priority Data

Aug. 4, 1972 Japan ................................ 47-92310

[52] U.S. Cl. ........ 178/6.6 R; 178/6.6 B; 178/6.7 R; 346/139 R

[51] Int. Cl.² .. H04N 1/22; G03F 7/02; G01D 15/00

[58] Field of Search ....... 178/6, 6.6 R, 6.6 B, 6.7 R, 178/7.6, 7.3 R, 7.4; 346/139 A, 140, 139 R, 125, 132; 101/DIG. 2

[56] References Cited

UNITED STATES PATENTS

| | | | |
|---|---|---|---|
| 2,733,510 | 2/1956 | Darago | 178/6.7 R |
| 2,925,464 | 2/1960 | Raible | 178/6.6 B |
| 3,363,261 | 1/1968 | Maiershofer | 346/139 A |
| 3,710,019 | 1/1973 | Hell et al. | 178/7.6 |

*Primary Examiner*—Raymond F. Cardillo, Jr.
*Attorney, Agent, or Firm*—Zarley, McKee, Thomte & Voorhees

[57] ABSTRACT

In a cylinder-scanning type image recording device, a subsidiary scanning direction of a recording head is shifted in inclination to the axis of a recording cylinder in order to obtain an image record inclined to an original.

4 Claims, 5 Drawing Figures

RECORDING HEAD SHIFTING MECHANISM OF CYLINDER-SCANNING TYPE IMAGE RECORDING DEVICE

This invention relates to a recording head shifting mechanism of a cylinder-scanning type image recording device, particularly to the one suitable to be used in an electronic plate-making machine such as an electronic color scanner.

An object of the invention is to provide a recording head shifting mechanism, in which the subsidiary scanning direction of a recording head is shifted along a guide inclined to the axis of a recording cylinder in order to obtain an image record inclined to an original.

Other objects and advantages of the invention will be apparent from the following description in connection with the accompanying drawings in which.

Figure 1:
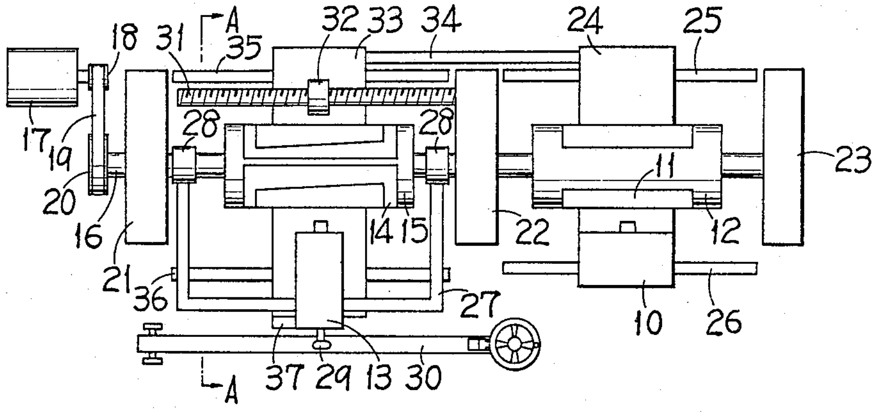
FIG. 1 is a plan view of a cylinder-scanning type electronic color scanner embodying the invention.

FIG. *4a* is an original and FIG. *4b* illustrates the shape of an image record obtained by the scanner of the invention.

Referring now to the drawings, there is indicated at 10 a head for scanning a color original 11 mounted on a cylinder 12, which head produces electric color separation signals. The electric signals are supplied to a recording head 13 and is used to modulate the light source mounted in the head for exposing a photosensitive film 14 on a record cylinder 15 so as to obtain a color separation record of the image of the original subject. The main scannings of the original cylinder 12 and the record cylinder 15 are performed by the rotation of a shaft 16 which is integrally secured to both cylinders 12 and 15. The shaft 16 is rotatably driven by means of a motor 17 through pulley 18, belt 19 and pulley 20. Reference numerals 21, 22 and 23 are applied to bearings of the shaft 16.

The scanning head 10 is mounted on a bed 24. Thus, the subsidiary scanning of the original 11 is performed by the shifting of the bed 24 along guide rails 25 and 26 extending in parallel to the axis of the original cylinder 12.

Figure 2:
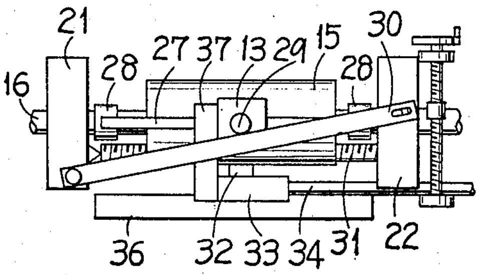
FIG. 2 is a frant view of the recording unit of the scanner of FIG. 1.
Figure 3:
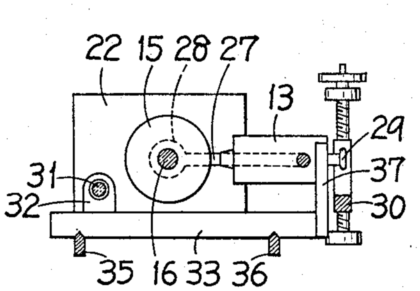
FIG. 3 is a cross-sectional view of the scanner taken along the line A—A of FIG. 1.
Figure 4A:
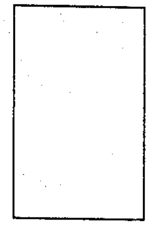
Figure 4B:
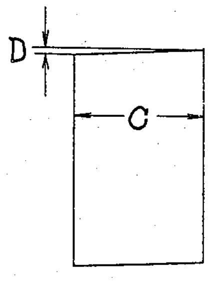

The recording head 13 is carried by the intermediate portion of a rod 27 having U-shaped configuration in plan as viewed in FIG. 1. The recording head 13 is so mounted on the rod 27 that the head can slide along the rod but cannot rotate about the rod. Each end of the rod 27 has a bearing 28 which rotatably engages with the shaft 16. Provided on the front panel of the recording 13 is a wheel 29 which is adapted to wheel on and along a guide bar 30 that is inclined with respect to the axis of the record cylinder 15 as shown in FIG. 2.

Reference numeral 31 is applied to a threaded feeding rod for subsidiary scanning. 32 is a nut for engaging the feeding rod 31 and fixed on a recording head base 33. The rotation of the threaded feeding rod 31 drives the recording head base 33 in the sibsidiary scanning direction. Two head bases 24 and 33 are connected to each other by a rod 34 for their simultaneous movement. 35 and 36 are guide rails for the movement of the recording head base 33.

For subsidiary scanning with the recording head 13, the recording head base 33 is fed on the threaded feeding rod 31 in the axial direction of the record cylinder 15 and a stopper 37 fixed at the corner of the base 33 actuates the recording head 13 in the subsidiary scanning direction.

The guide bar 30 is supported with a revolving pin 38 whose one end is being fixed to the body of the color scanner. 39 is a threaded rod for setting the angle of inclination of the guide bar 30. 40 are bearings properly mounted on the scanner body. 41 is a handle for angle setting. Guide hole 42 provided on the other end of the guide bar 30 is fit with a guide pin 43 which is protrudingly mounted on the nut 44 being engaged with the threaded rod 39 for angle setting.

Therefore, the inclination angle of an image record to the original subject can readily be changed as needed by rotating the threaded rod 39 for angle setting to change the inclination of the guide bar 30 in the horizontal direction.

Although omitted in the drawings because it is well known, a guide is provided to the nut 44 in parallel with the threaded rod 39 for preventing the rotation in the axial direction. In printing with use of a printing plate, if the plate surface is squeezed with a doctor blade or the like, this doctor blade inadvantageously hooks the image etched on the plate surface. Especially when the direction of the etched image and that of the edge of the doctor blade are the same, such hooping of the image produces even stronger shock. In printing with use of e.g., a roll for textile printing, if an image is engraved parallel to the roll axis, a doctor blade may be hooked upon squeezing the plate surface and cause a strong shock. However, a recorded image inclined to that of the original subject is obtained with the device according to the invention, and an image to be engraved in parallel with the roll axis is given some inclination, by which a shock caused by squeezing of the plate surface with a doctor blade can be softened. When plating a roll for textile printing, a photoetching method is to be used.

In FIG. *4b*, there is shown the shape of a recorded image. When scanning an original like FIG. *4a*, an inclined image like FIG. *4b* can be obtained.

The angle of inclination upon plating a roll for textile printing is approximately C : D = 24 : 1. An angle of inclination of this degree is sufficient to decrease the shock caused by squeezing and the distortion of the image is negligible.

As described hereinabove, the present invention provides a simply constructed recording head shifting mechanism for obtaining an inclined image in a cylinder scanning image recording device. If it is used in an electronic plate-making machine, an inclined image can be obtained, thus said shock caused by squeezing can be decreased when plating with this inclined image recording device.

In the illustrated embodiment, an electronic color scanner which records by disposing an inclined image on a photosensitive film has been described. However, it is obvious that the invention can also be used in direct engraving of a cylindrical printing material and is applicable in other recording methods.

We claim:

1. A recording head shifting mechanism for a cylindrical scanning type image recording device, wherein the surface of a recording cylinder may be squeezed by a doctor blade smoothly and efficiently without catching on burrs or the like on the surface of said recording cylinder, comprising, a cylindrical scanning recording device having a recording cylinder, a recording head for movement parallel to the longitudinal axis of said recording cylinder, a guide bar in spaced apart relationship with said recording cylinder, means extending from said recording head to said guide bar to make said recording head responsive to changes in inclination of said guide bar, and means to change the angle of inclination of said guide bar with respect to the longitudinal axis of said recording cylinder.

2. The device of claim 1 wherein said recording head is movable both parallel to the longitudinal axis of said recording cylinder and transverse to the longitudinal axis of said recording cylinder.

3. The device of claim 2 wherein the angle of inclination of said guide bar can be changed sufficiently with respect to the longitudinal axis of said recording cylinder to effectively decrease shock caused by squeezing said cylinder with a doctor blade and yet produce an image of negligible distortion.

4. The device of claim 3 wherein said guide bar, at one end is vertically pivotally connected to the recording device and at the other end is fitted to a nut which engages a threaded rod rotatable about a vertical shaft whereby said guide bar responds by vertical changes in inclination to rotational movement of said threaded rod.

* * * * *